United States Patent [19]
Farrell et al.

[11] Patent Number: 5,014,195
[45] Date of Patent: May 7, 1991

[54] CONFIGURABLE SET ASSOCIATIVE CACHE WITH DECODED DATA ELEMENT ENABLE LINES

[75] Inventors: James A. Farrell, Marlboro; Richard L. Sites, Boylston, both of Mass.

[73] Assignee: Digital Equipment Corporation, Inc., Mass.

[21] Appl. No.: 522,503

[22] Filed: May 10, 1990

[51] Int. Cl.$^5$ ............................................. G11C 13/00
[52] U.S. Cl. ...................................... 364/200; 365/49; 365/230.01; 364/900; 364/243.41; 364/243.44
[58] Field of Search ............... 365/49, 230.01, 230.03, 365/230.05, 189.01, 189.03, 189.04; 364/200, 900

[56] References Cited

U.S. PATENT DOCUMENTS

| | | |
|---|---|---|
| 4,264,953 | 4/1981 | Douglas et al. |
| 4,317,168 | 2/1982 | Messina et al. |
| 4,332,010 | 5/1982 | Messina et al. |
| 4,464,712 | 8/1984 | Fletcher |
| 4,484,267 | 11/1984 | Fletcher |
| 4,493,026 | 1/1985 | Olnowich |
| 4,493,027 | 1/1985 | Katz et al. |
| 4,719,568 | 1/1988 | Carrubba et al. |
| 4,724,518 | 2/1988 | Steps |
| 4,736,293 | 4/1988 | Patrick |

OTHER PUBLICATIONS

The IBM Technical Disclosure Bulletin, vol. 27, No. 10B, Mar. 1985, pp. 6084-6088.
Smith, A. J., "Cache Memories", in Computing Surveys, vol. 14, No. 3, Sep. 1982.
Strecker, W. D., "Cache Memories for PDP-11 Family Computers", in Computer Engineering, by Bell, Mudge, and McNamara, pp. 263-267, (1978: Digital Equipment Corporation, Bedford, Mass.).

Primary Examiner—Terrell W. Fears
Attorney, Agent, or Firm—Cesari and McKenna

[57] ABSTRACT

A set associative cache using decoded data element select lines which can be selectively configured to provide different data sets arrangements. The cache includes a tag array, a number of tag comparators corresponding to the maximum possible number of sets, a data element select logic circuit, and a data array. The tag and data arrays each provide, in response to an input address, a number of output tag and data elements, respectively. The number of output tag and data elements depends upon the maximum set size desired for the cache. An input main memory address is used to address both the tag and data arrays. The tag comparators compare a tag field portion of the input main memory address to each element output from the tag array. The select logic then uses the outputs of the tag comparators and one or more of the input main memory address bits to generate decoded data array enable signals. The decoded enable signals are then coupled to enable the desired one of the enabled data elements.

7 Claims, 4 Drawing Sheets

CONFIGURABLE SET ASSOCIATIVE CACHE WITH DECODED DATA ELEMENT ENABLE LINES

FIELD OF THE INVENTION

This invention relates generally to the field of data processing systems, and particularly to a configurable set associative cache using decoded data element select lines.

BACKGROUND OF THE INVENTION

Cache memories are small, relatively high speed buffers used in modern data processing systems to temporarily store those portions of main memory which are currently in use. In a such a system, each main memory address specified for access is first passed to the cache. If the cache is currently assigned to hold the contents of that address, a "cache hit" occurs and the cache is enabled to complete the access. If this is not the case, a "cache miss" has occurred, and the main memory must be enabled. Typically, the cache can be read- and write-accessed on the order of ten times faster than the main memory. A central processing unit (CPU) associated with data processing system having a cache thus needs to spend far less time waiting for instructions and operands to be read or written.

When a miss occurs, the cache typically assigns the requested miss address to itself, and thereby displaces an old cache address which has not been accessed for some time. This has the effect of reassigning the old address to the main memory. Because of the highly local, repetitive nature of memory references in the vast majority of data processing applications, the use of such a replacement algorithm has been repeatedly proven to result in cache misses five percent or less of the time.

Rather than being directly addressable by the CPU, an ideal cache operates as a transparent buffer. Thus, in order to locate the contents of an address assigned to the cache, a mechanism is necessary for mapping each main memory address into a cache location. One commonly used scheme is to arrange the cache into so-called tag elements and associated data elements. Each tag element corresponds to one of the main memory addresses, and its associated data element represents the contents of that main memory location.

The portion of the cache which stores the tag elements is referred to as the tag array, while that which stores the data elements is called the data array. Rather than search the tag array sequentially to match the input main memory address, which would be quite slow, most contemporary caches use a portion of the requested main memory address as an index to look up the corresponding tag. In one such approach, called direct mapping, the index is directly fed to the address inputs of the tag array. If the tag element fetched matches the main memory address, a hit occurs, and the corresponding data element is enabled for access.

This approach does not maximize the probability of finding the data element associated with a given input index, however. Most caches thus perform what is called a set-associative tag search. In a set-associative cache, a portion of the main memory address is used as the index to address the tag and data arrays, as before. However, the tag and data arrays are arranged so that multiple tags and corresponding data elements are fetched and enabled for each access.

More particularly, for a set-associative cache, indexing is accomplished by dividing the input main memory address into three fields, a tag field which usually occupies the high order bits, an index field which occupies the middle order bits, and an optional byte field which consists of the remaining bits. The index field is used to select one set of tag elements and their associated data elements. The selected tag elements are then compared against the tag field of the input main memory address. If there is a match, a hit occurs. The byte field can be used to select a desired one (or perhaps some sub-unit, such as a single byte) of the data elements associated with the matched tag element.

The maximum allowable number of tags associated with a particular index is called the set size. A cache which retrieves two tag elements per index is said to be two-way set associative, one with four tag elements per index four-way set associative, and so forth.

Some implementations of set-associative caches have the tag and data arrays fabricated on the same custom semiconductor integrated circuit chip. Because critical components can then be placed as close together as possible, this reduces the delay between the time the tag array contents are matched and selection of the desired one of the data elements. However, such an arrangement does not lend itself to easy expansion of the set size.

Another approach is to use separate chips for the tag and data arrays. This works quite well for a direct mapped cache, since the index field can be used to address the tag and data arrays in parallel. While this approach allows expansion of the set size without too much difficulty, it unfortunately requires the results of the tag comparison to be available before the data array access can begin. The cache access time is the sum of the tag array access time, tag compare time, and data array access time using this approach, which is significantly slower than it would be for a direct-mapped cache.

Thus a set-associative cache having an easily expandable set size while retaining a cache access time on the order of a direct-mapped cache is desirable.

In certain applications, such as for multi-tasking processors with virtual addressing, it is also desirable to support dynamic selection of the number of data sets.

SUMMARY OF THE INVENTION

In brief summary, a set associative cache constructed in accordance with the invention includes a tag array, a data array, a number of tag comparators corresponding to the maximum possible number of sets, and a data element select circuit. The tag and data arrays each provide, in response to an input address, a number of output tag and data elements, respectively. The number of output tag and data elements depends upon the maximum number of sets desired for the cache. An index field portion of an input main memory address is used to address both the tag and data arrays. The tag comparators compare a tag field portion of the input main memory address to each element of the tag array addressed by the index field. The select logic then uses the outputs of the tag comparators and/or one of the input main memory address bits to generate decoded data array enable signals. The decoded enable signals are then finally coupled to enable access to the data elements which were addressed by the index field.

The select logic can also operate on input cache configuration signals to generate the decoded enable signals.

The data array can be an integrated circuit chip separate from the other components.

Several advantages result from this arrangement. Because the final determination of the selected data element is deferred until late in the access cycle, the data array access can begin earlier, concurrent with the tag access operations, and thus the overall cache access time is reduced. The time previously needed to process encoded data array address bits is eliminated.

Decoded data array enable signals provide certain other advantages, including prevention of invalid data bus states. With prior arrangements, transient invalid states sometimes occur at the input/output ports of the data array, for example, when the tag comparators indicate no match.

The input cache configuration signals provide a dynamically selectable set associativity. The number of sets is changed by merely changing the cache configuration signal inputs, which can occur under software control from a central processing unit if desired. The optimum number of sets in a given instance is known to depend upon the task-switch interval of the central processing unit, since the longer the interval and the smaller the number of sets, the less chance there is of finding the working set still in the cache. The invention thus allows dynamic measurement of performance with different cache configurations.

Because the data array need not be fabricated on the same semiconductor integrated circuit as the tag array to achieve a fast access time, the cache exhibits both easy expandability and fast access time.

BRIEF DESCRIPTION OF THE DRAWINGS

This invention is pointed out with particularity in the appended claims. How the above and further advantages of the invention are achieved may be better understood by referring to the following description in conjunction with the accompanying drawings, in which:

DETAILED DESCRIPTION OF AN ILLUSTRATIVE EMBODIMENT

Figure 1:
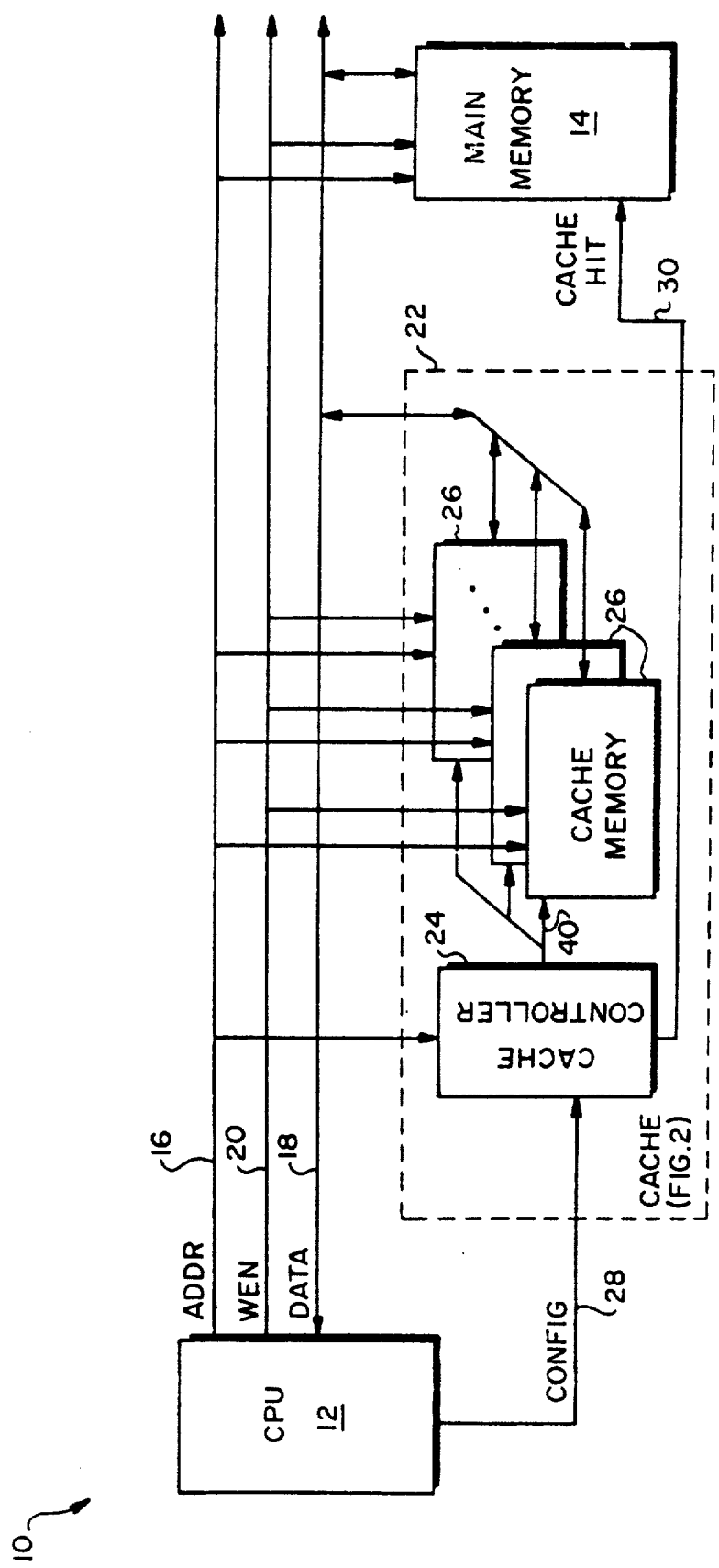
FIG. 1 depicts a block diagram of a data processing system including a cache constructed in accordance with the invention.

Referring in particular to FIG. 1, there is shown a data processing system 10 including a central processing unit (CPU) 12, main memory 14, and set associative cache 22 interconnected by an address bus 16, data bus 18, and write enable signal 20. The main memory 14 is constructed with appropriate, conventional, cost-effective, bulk storage devices, such as, for example, dynamic random access memory (DRAM) integrated circuits. The CPU 12 sends main memory address signals over the address bus 16 to perform memory accesses, which include both reading data from or writing data into the main memory 14. The write enable signal 20 controls whether the memory access results in data being read or written.

In general the cache 22 includes a cache controller 24 and one or more cache memories 26. The cache memories 26 are constructed from appropriate, fast access-time storage devices, such as static random access memory (SRAM) integrated circuits. When the CPU 12 provides an input main memory address over the address bus 16, the cache 22, and specifically the cache controller 24, first checks to see if the data corresponding to that input address is in the cache memories 26. If so, the cache controller 24 enables the appropriate one or more cache memories 26 so that the data access can take place. A cache hit signal 30 is then asserted to inform the main memory 14 to disregard the request from the CPU 12. However, if the cache controller 24 does not recognize the address as one assigned to the cache memories 26, then the cache hit signal 30 is not asserted, and the main memory 14 is enabled to perform the desired memory access.

The data access operation of the cache 22 is transparent to the CPU 12 in the sense that once an initial configuration sequence of the cache 22 is accomplished, the CPU 12 need only transmit and receive main memory addresses and data over buses 16 and 18, and need not be concerned with whether the data access is actually performed by the cache 22 or main memory 14. As part of the initial configuration sequence, cache configuration signals 28 are fed to cache controller 24 by CPU 12 in order to provide decoded enable signals 40 so that the cache memories 26 are configured as a one-way, two-way, or four-way set associate cache.

Figure 2:
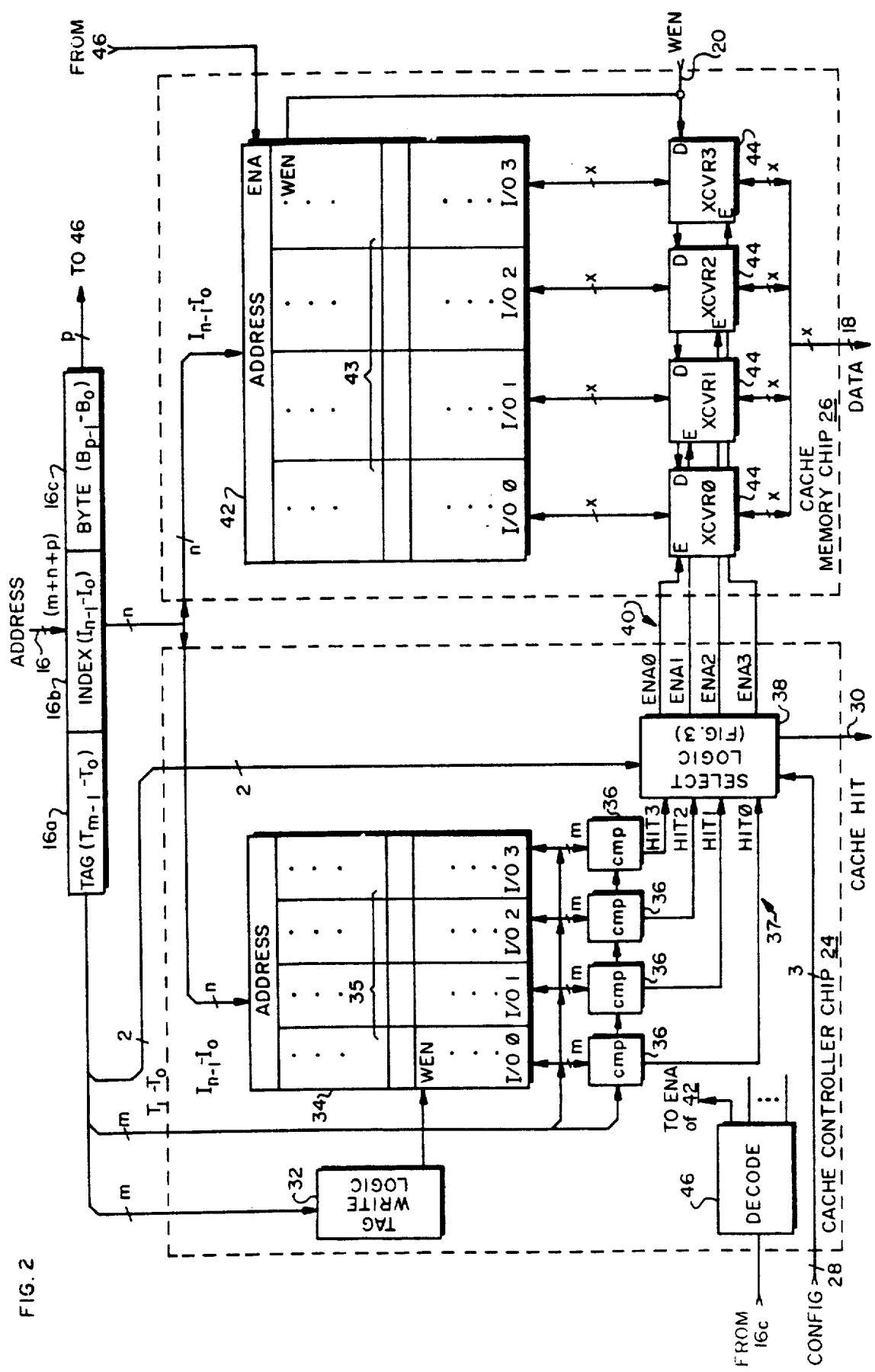
FIG. 2 is a detailed block diagram of the cache showing the cache controller and data memory.

FIG. 2 depicts an embodiment of cache controller 24 and an exemplary cache memory 26 in greater detail. The cache controller 24 includes a tag write logic circuit 32, a tag array 34, four tag comparators 36, and select logic 38. The exemplary cache memory 26 includes a data array 42 and four transceivers 44.

The components of cache 22 operate on input main memory addresses received from the CPU 12 over the address bus 16 to selectively enable access to the data array 42 if that input main memory address is assigned to the cache 22. The input main memory addresses are all $m+n+p$ bits wide. During these operations, cache 22 separately considers selected fields of the input main memory address, including a tag field 16a consisting of the highest-order m bits (labelled $T_{m-1}$-$T_0$), an index field 16b consisting of the next-highest order n bits (labelled $I_{n-1}$-$I_0$), and an optional byte field 16c consisting of the remaining lower order p bits (labelled $B_{p-1}$-$B_0$).

The tag write logic 32 monitors the input main memory addresses input from the CPU 12 over the address bus 16. Its function is to decide, in a known manner not critical to the operation of this invention, which addresses are processed by the cache 22 and which by the main memory 14. The cache 22, and specifically the contents of the tag array 34 are thus periodically rewritten automatically from the tag field 16a as main memory addresses are requested by CPU 12.

The remaining functions assigned to the rest of the components of cache 22, and those of primary importance to this invention, are to determine if an input main memory address presented over address bus 16 is assigned to the cache 22, and if so, to enable the appropriate element of the data array 42. During this function, the index field 16b, in particular the n bits $I_{n-1}$-$I_0$, is used to address the tag array 34. The set size of the cache 22 is thus $2^n$; that is, each set may have at least $2^n$ elements. (The set size should not be confused with the number of sets.) For the illustrated embodiment, the cache 22 can be arranged into as many as four sets.

Accordingly, an exemplary location 35 of the $2^n$ locations in the illustrated tag array 34 has four elements which are output in parallel at the input/output ports I/O0, I/O1, I/O2 and I/O3 of the tag array 34 after the n index field bits $I_{n-1}$-$I_0$ appear at the ADDRESS input. The tag array 34 input/output ports are each m bits wide, where m is the size of the tag field 16a.

Each of the four tag comparators 36 compares the tag element appearing at its associated input/output port of the tag array 34 with the tag field 16a. If there is a match each comparator 36 asserts a corresponding one of four hit signals 37 (labelled HIT0, HIT1, HIT2 and HIT3).

The select logic 38 then operates on the four hit signals 37, the input cache configuration signals 28, and two of the tag field 16a bits, $T_1$-$T_0$, to provide four decoded enable signals 40 (labelled ENA0, ENA1, ENA2 and ENA3). It is the select logic 38 which allows the cache 22 to be reconfigured, and the exact operation of the select logic 38, discussed in more detail in FIG. 3, which is primarily responsible for accomplishing this.

Simultaneous with the operation of the tag array 34, the data array 42 also accepts the index portion 16b at its ADDRESS inputs. The data array 42 thereby provides parallel access to the four data elements stored at the location 43 selected by its ADDRESS inputs via its input/output ports I/O0, I/O1, I/O2 and I/O3. Whether a particular access is a read access or a write access is controlled by the state of the write enable signal 20 labelled WEN fed from the CPU 12.

Each input/output port of the data array 42 is x bits wide, where x depends upon the desired data element size. In the preferred embodiment, x equals eight so that the data array memory 26 is a byte-wide slice, but other sizes are possible. With this arrangement, as alluded to by FIG. 1, additional cache memories 26 are typically arranged in parallel to increase the data element size to correspond to at least the number of parallel bits in the data bus 18, which is usually the basic word size of the CPU 12. For example, in a preferred embodiment the CPU 12 word size, the desired data element size and hence the width of the data bus 18 are all 32 bits, so that four byte-slice cache memories 26 are arranged in parallel.

Returning to the discussion of a typical one of the cache memories 26, the four transceivers 44 perform a multiplexing operation to select the desired data element from the four data elements presented by the data array 42. In particular, one of the bi-directional ports of each transceiver 44 couples to a corresponding one of the input/output ports of the data array 42. The other bi-directional ports of each transceiver 44 are connected together, in parallel, at the data bus 18. The four decoded enable signals 40 are connected to control the enable inputs of the four transceivers 44. As discussed later in greater detail, only one of the decoded enable signals 40 is preferred to be asserted at a given time.

The write enable signal 20 is used to control the direction of the transceivers 44, and thus allows the data path from the data bus 18 to the data array 42 to be enabled during a write access, and the data path from the data array 42 to the data bus 18 to be enabled during a read access.

An optional byte decoder 46 can allow further expansion of the set size. For example, if a byte decoder 46 is used, additional data arrays 42 can be associated with each transceiver 44. The byte decoder 46 operates on the p bit byte field 16c to enable only one of the of the data arrays 42 at a particular time via an enable input ENA. Expansion in this manner will slow access time for the cache memory 26, in relation to the number of bits p. The byte decoder 46 is preferably fabricated as part of the cache controller 24, but can be a separate circuit if desired.

The components of the cache controller 24 can be fabrication on the same integrated circuit chip, with the illustrated components of the cache memory 26 fabricated on other chips. This affords maximum flexibility in expansion of the set size, since cache memory 26 chips can be added without changing the cache controller 24 chip. It is also a fairly simple exercise to increase the maximum number of sets by adding cache controller 24 chips in parallel (and a corresponding number of cache memory 26 chips). With this arrangement, only the decoded enable signals 40 need to be passed between the select logic 38 on the cache controller 24 chip and the transceivers 44 on the cache memory 26 chips.

Several advantages result from this arrangement. Because the final determination of the selected data element is deferred to late in the cache access cycle time, parts of the data array access can occur concurrently with the tag access and tag compare operations. The overall cache access time is thus reduced. In particular, the majority of the time needed to access the data array 42 occurs in parallel with the access of the tag array 34. Unlike a design which uses encoded data array address bits, access to a data array 42 constructed in accordance with this invention does not have to wait for these bits to be decoded. Using decoded enable signals 40 also provides an easy way to prevent possible invalid states from occurring at the input/output terminals of the data array, which can occur, for example, if the tag comparators 36 indicate no match.

The input cache configuration signals 28 provide a dynamically selectable set associativity, since the number of sets is changeable by merely changing the cache configuration signals 28 input levels. This can occur under software control from the CPU 12 if desired. The optimum number of sets in a given instance is known to depend upon the task-switch interval of the central processing unit 12, since the longer the interval and the smaller the number of sets, the less chance there is of finding the working set still in the cache.

Figure 3:
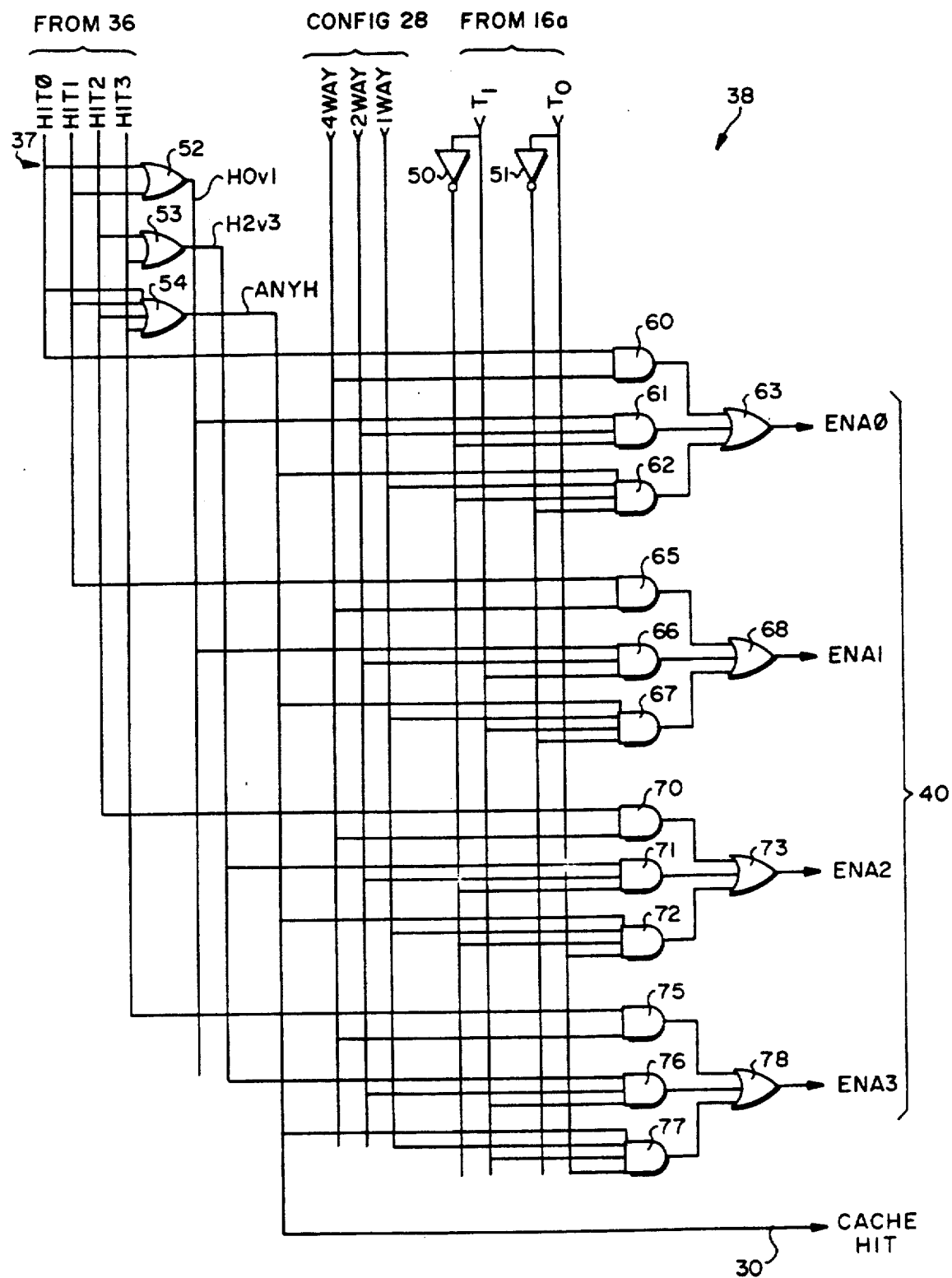
FIG. 3 is a schematic diagram of the select logic portion of the cache controller.

FIG. 3 is an electrical schematic diagram showing a preferred embodiment for the select logic 38. It operates on the outputs 37 of the four tag comparators 36 (HIT0, HIT1, HIT2, and HIT3), three input cache configuration signals 28 (4WAY, 2WAY, and 1WAY) which indicate the desired set associativity arrangement for the cache 22, and two bits of the tag field 16a ($T_1$-$T_0$), to provide the four decoded data array enable signals 40 (ENA0, ENA1, ENA2 and ENA3). OR gate 54 asserts a true output (ANYH) when any of the tag comparator outputs 37 are asserted, which is used when the 1WAY cache configuration signal 28 is asserted. OR gate 52 asserts a true output signal (H0V1) when either the HIT0 or HIT1 signals is asserted, just as OR gate 53 asserts a true output signal (H2V3) when either HIT2 or HIT3 is asserted. Inverters 50 and 51 provide the complement of the two tag field bits $T_1$ and $T_0$. The cache hit signal 30 is also generated by the OR gate 54.

From inspection of FIG. 3 it is evident that AND gates 60, 61, and 62 and OR gate 63 allow the ENA0 signal to be asserted when (1) the desired configuration is four-way set associative as indicated by an asserted 4WAY signal and the HIT0 signal is also asserted, or (2) when the two-way set associative configuration is selected by an asserted 2WAY signal and either HIT0 or HIT1 is asserted and the In bit is not asserted, or (3) when the one-way associative configuration is selected by asserting the 1WAY signal and any of HIT0, HIT1, HIT2, or HIT3 is asserted and both the $T_1$ and $T_0$ bits are not asserted.

Likewise, AND gates 65, 66, and 67 and OR gate 68 allow the ENA1 signal to be asserted when (1) 4WAY and HIT1 are asserted, or (2) when 2WAY and either HIT0 or HIT1 and In are asserted, or (3) when 1WAY and any of HIT0, HIT1, HIT2, or HIT3 is asserted and $T_1$ is not asserted and $T_0$ is asserted. AND gates 70, 71, 72 and OR gate 73 perform similarly to generate the ENA2 signal, as AND gates 75, 76, and 77 and OR gate 73 generates the ENA3 signal. The following logic truth table is of some assistance in determining the operation of the select logic 38:

| INPUTS | | | | | | | | | | | | OUTPUTS | | | |
|---|---|---|---|---|---|---|---|---|---|---|---|---|---|---|---|
| 4WAY | 2WAY | 1WAY | HIT3 | HIT2 | HIT1 | HIT0 | H0v1 | H2v3 | AnYH | T1 | T0 | ENA3 | ENA2 | ENA1 | ENA0 |
| 1 | x | x | x | x | x | 1 | x | x | x | x | x | 0 | 0 | 0 | 1 |
| x | 1 | x | x | x | x | x | 1 | x | x | x | 0 | 0 | 0 | 0 | 1 |
| x | x | 1 | x | x | x | x | x | x | 1 | 0 | 0 | 0 | 0 | 0 | 1 |
| 1 | x | x | x | x | 1 | x | x | x | x | x | x | 0 | 0 | 1 | 0 |
| x | 1 | x | x | x | x | 1 | x | x | x | x | 1 | 0 | 0 | 1 | 0 |
| x | x | 1 | x | x | x | x | x | x | 1 | 0 | 1 | 0 | 0 | 1 | 0 |
| 1 | x | x | x | 1 | x | x | x | x | x | x | x | 0 | 1 | 0 | 0 |
| x | 1 | x | x | x | x | x | x | 1 | x | x | 0 | 0 | 1 | 0 | 0 |
| x | x | 1 | x | x | x | x | x | x | 1 | 1 | 0 | 0 | 1 | 0 | 0 |
| 1 | x | x | 1 | x | x | x | x | x | x | x | x | 1 | 0 | 0 | 0 |
| x | 1 | x | x | x | x | x | x | 1 | x | x | 1 | 1 | 0 | 0 | 0 |
| x | x | 1 | x | x | x | x | x | x | 1 | 1 | 1 | 1 | 0 | 0 | 0 |

("x" indicates don't care about the signal state, "1" an asserted signal, and "0" a non-asserted signal)

It is preferred, then, that only one of the decoded enable signals 40 is asserted at any given time. This will always occur regardless of the contents of the tag array 34 when the four-way mode is enabled, but must be insured by appropriately arranging the contents of the tag array 34 in the other two modes. For example, tag elements must be written so that when two-way mode is selected, a tag field 16a yielding a match on say the HIT0 comparator prevents a match from occurring on either the HIT2 or the HIT3 comparator.

The allowable states for the decoded enable signals 40 can be thus thought of as falling into two categories. The first is a "no-address" state, which occurs when none of the decoded enable signals 40 are asserted. A second category of "valid address" states occurs when one of the decoded enable signals 40 is asserted, and the rest are not asserted. Having only these two possible categories of states of decoded enable signals 40 is particularly advantageous since at most only one of the transceivers 44 will ever be enabled at a given instant, and will be enabled only after the ADDRESS inputs of the data array 42 have settled. If this were not the case, invalid states might occur on the data bus 18, since more than one transceiver 44 might be temporarily enabled.

Additionally, if two encoded enable signals were used instead of the four decoded enable signals 40, invalid states may also occur on the data bus 18 during state transitions of the encoded enable signals, since one or more of the transceivers 44 might be temporary enabled when they should not be. Such encoded enable signals would also require additional logic to handle the situation when a cache miss occurs, since there would be no way to communicate the "no-address" state.

Figure 4:
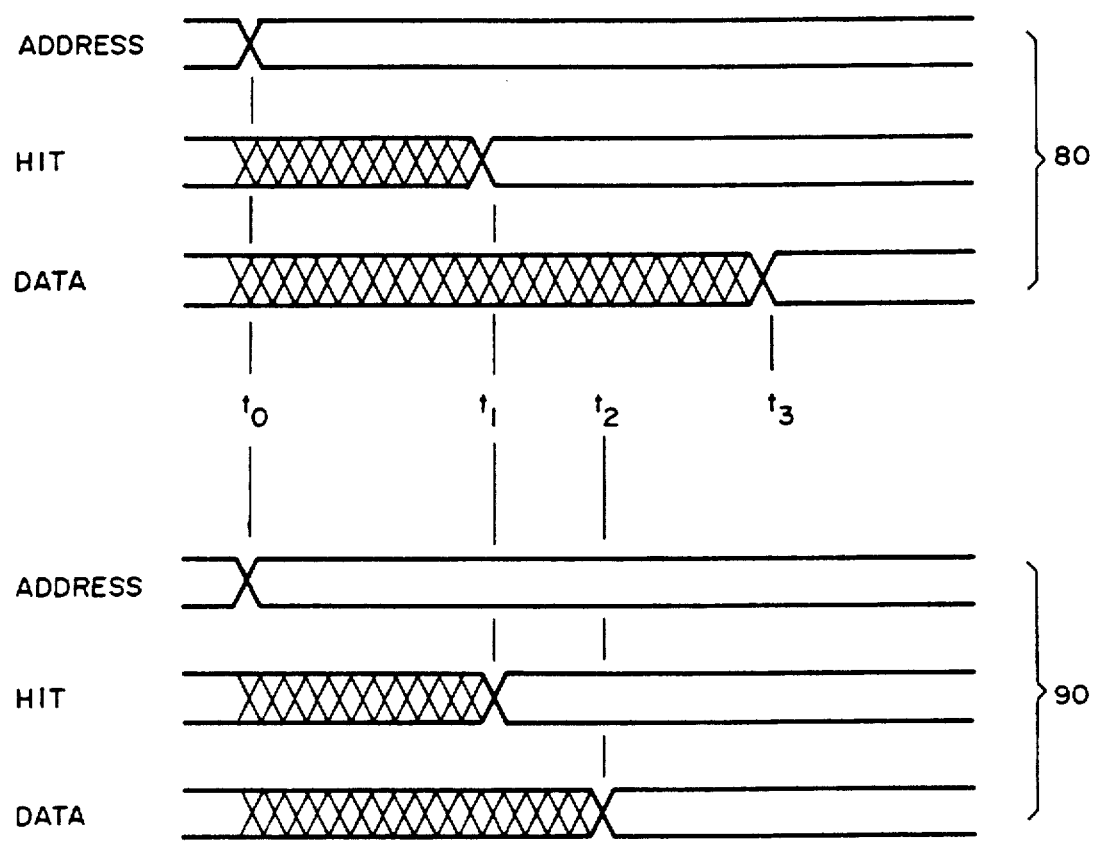
FIG. 4 is an access timing diagram for the cache.

Finally, FIG. 4 shows the access time improvement available with this invention when compared to certain prior caches. The upper signal traces 80 represent a typical read access cycle in a prior cache system which used encoded data element select lines. If the address bus signals (ADDRESS) were stable by a time $t_0$, the tag comparator outputs (HIT) would be stable by time $t_1$, where $t_1$ equals $t_0$ plus the access time of the tag array and the comparator delay. Since this prior cache used encoded tag matches lines to directly address the data array, the output of the cache (DATA) is not stable until a time $t_3$, which is equal to $t_1$ plus the access time of the data array.

However, with the present invention, the read access timing diagram looks like the lower traces 90. Although the address bus signals (ADDRESS) on the address bus 16 and the outputs of the tag comparators 36 (HIT) are again stable at times $t_0$ and $t_1$, respectively, the output of the cache 22 on the data bus 18 (DATA) is available at a time $t_2$, occurring before time $t_3$. This is possible since the majority of the time spent accessing the data array 42 occurs simultaneously with the tag array 34 access, between times $t_0$ and $t_1$. The only additional time, $t_2$-$t_1$, needed is that required for the decoded enable signals 40 to propagate from the select logic 38 to enable the correct transceiver 44, which is less than the time to decode the prior fully encoded address, $t_3$-$t_1$.

The foregoing description has been limited to a specific embodiment of this invention. It will be apparent, however, that variations and modifications may be made to the invention, with the attainment of some or all of the advantages of the invention. For example, although a maximum four-way set associative cache is illustrated, the concepts are readily extendible to provide higher maximum set associativity. A maximum eight-way set associative cache can be constructed if each location in the tag array 34 and data array 42 consists of eight elements presented in parallel, an additional bit $T_3$ is used from the tag field 16a, eight tag comparators 36 and transceivers 44 are included, and the select logic 38 is appropriately expanded. As previously discussed, the particular set associativity implemented at a given instant in time is always determined by the input cache configuration signals 28.

Other multiplexing schemes are possible for making use of the byte field 16c. For example, rather than have the outputs of the byte decoder 46 drive an enable input of the cache memories 26, they could select desired ones of a plurality of transceivers 44.

The transceivers 44 could be fabricated on separate chips if desired, which would allow using industry standard components for the data array 42.

Additionally, rather than forward just a cache hit signal 30, address bus 16 can be arranged not as shown in FIG. 1, but to pass main memory address signals directly from the CPU 12 to only the cache 22 first. The cache 22 then forwards main memory address only when a miss occurs, which has been found to alleviate problems with unacceptable driving impedances sometimes encountered with a single shared address bus 16.

Accordingly, it is the object of the appended claims to cover all such variations and modifications as come within the true spirit and scope of the invention.

What is claimed as new and desired to be secured by Letters Patent of the United States is:

1. A set associative cache for operating on an input main memory address, the input main memory address including a tag field and index field, comprising:
   A. a tag array providing, in response to the index field, a plurality of tag elements in parallel, the plurality of tag elements being equal to a predetermined maximum set size into which the cache can be configured;
   B. a plurality of tag comparators, each tag comparator arranged to receive a corresponding one of the tag elements and the tag field, and each tag comparator asserting a corresponding tag hit signal when its received tag element matches the tag field;
   C. a data array providing, in response to the index field, a plurality of data elements, the plurality of data elements being equal to the predetermined maximum set size;
   D. a data element select logic circuit providing, in response to the tag field and the plurality of tag hit signals, a plurality of decoded data element enable signals, the plurality of decoded data element enable signals being equal to the predetermined maximum set size; and
   E. multiplexing means, arranged to receive the plurality of data elements and the plurality of decoded data element enable signals, for enabling access to a selected one of the data elements.

2. An apparatus as in claim 1 wherein the multiplexing means comprises a plurality of bi-directional transceivers, each transceiver coupled to receive a corresponding one of the data elements at one input port and coupled to the other transceivers at another input port.

3. An apparatus as in claim 1 wherein the data element select logic is also responsive to a signal indicating the current number of sets into which the cache is arranged, additionally comprising:
   F. means for generating the signal indicating the current number of sets into which the cache is arranged.

4. A set associative cache for operating on an input main memory address, the input main memory address including a tag field and index field, comprising:
   A. tag array means, responsive to the index field, for providing a plurality of tag elements in parallel, the number of tag elements equal to a predetermined maximum set size into which the cache can be configured;
   B. data array means, responsive to the index field, for providing a plurality of data elements in parallel, the number of data elements equal to the predetermined maximum set size;
   C. means for allowing concurrent access to the tag array contents and the data array contents;
   D. a plurality of tag comparator means, each responsive to a corresponding one of the tag elements from the tag array and also responsive to the tag field from the input main memory address, for asserting a tag hit signal when the corresponding tag element from the tag array matches the tag field from the input main memory address; and
   E. means for deferring the enablement of access to a desired one of the data elements until the corresponding tag hit signal is asserted by the tag comparator means corresponding to the desired data element.

5. A data processing system comprising:
   a central processing unit providing memory address signals at an output, the memory address signals including a tag field and index field;
   a set associative cache for receiving the memory address signals and for selectively asserting or not-asserting a cache hit signal in response thereto; and
   main memory means, for receiving the memory address signals and the cache hit signal, and for enabling access to the set associative cache by the central processing unit when the cache hit signal is not asserted,
   wherein the set associative cache additionally comprises:
   A. a tag array providing, in response to the index field, a plurality of tag elements in parallel, the plurality of tag elements equal to a predetermined maximum set size into which the cache can be configured;
   B. a plurality of tag comparators, each tag comparator arranged to receive a corresponding one of the tag elements and the tag field, and each tag comparator asserting a corresponding tag hit signal when its received tag element matches the tag field;
   C. a data array providing, in response to the index field, a plurality of data elements, the plurality of data elements also equal to the predetermined maximum set size;
   D. a data element select logic circuit providing, in response to the tag field and the plurality of tag hit signals, a plurality of decoded data element enable signals, the plurality of decoded enable signals equal to the predetermined maximum set size, the data element select logic circuit also asserting the cache hit signal when any of the tag hit signals is asserted; and
   E. multiplexing means, arranged to receive the plurality of data elements and the plurality of decoded data element enable signals, for enabling access to a selected one of the data elements by the central processor.

6. A cache controller for enabling access to a cache memory element in response to an input memory address, the input memory address including a tag field and an index field, the cache controller comprising:
   A. tag array means, responsive to the index field, for providing a plurality of tag elements in parallel, the number of tag elements being equal to a predetermined maximum set size;
   B. a plurality of tag comparators, each tag comparator arranged to receive a corresponding one of the tag elements and the tag field, and each tag comparator asserting a corresponding tag hit signal when its received tag element matches the tag field; and C. a data element select logic circuit providing, in response to the tag field and the plurality of tag hit signals, a plurality of decoded data element enable signals, the number of decoded data element enable signals being equal to the predetermined maximum set size.

7. An apparatus as in claim 6 wherein the data element select logic circuit is also responsive to a signal indicating the current number of sets into which the cache is arranged, additionally comprising:

D. means for generating the signal indicating the current number of sets into which the cache is arranged.

* * * * *